(12) United States Patent
Newman et al.

(10) Patent No.: US 10,275,486 B2
(45) Date of Patent: Apr. 30, 2019

(54) MULTI-SYSTEM SEGMENTED SEARCH PROCESSING

(71) Applicant: Oracle International Corporation, Redwood Shores, CA (US)

(72) Inventors: Christopher Newman, Pasadena, CA (US); Richard Swift, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 302 days.

(21) Appl. No.: 14/845,121

(22) Filed: Sep. 3, 2015

(65) Prior Publication Data
US 2017/0068732 A1 Mar. 9, 2017

(51) Int. Cl.
*G06F 17/30* (2006.01)
(52) U.S. Cl.
CPC .. *G06F 17/30424* (2013.01); *G06F 17/30463* (2013.01)
(58) Field of Classification Search
None
See application file for complete search history.

(56) References Cited

U.S. PATENT DOCUMENTS

| | | | | |
|---|---|---|---|---|
| 4,961,139 | A * | 10/1990 | Hong | G06F 17/30 |
| 6,366,934 | B1 * | 4/2002 | Cheng | G06F 17/30011 |
| | | | | 707/999.2 |
| 7,702,614 | B1 * | 4/2010 | Shah | G06F 17/30622 |
| | | | | 707/739 |

OTHER PUBLICATIONS

Wells, 1.1: Topic Sentences Aug. 7, 2009, purdue.edu, https://owl.english.purdue.edu/engagement/2/1/29/.*
Wells. 1.1: Relevance of Ideas Aug. 7, 2009, purdue.edu, https://owl.english.purdue.edu/engagement/2/1/30/.*
Crispin, "Internet Message Access Protocol—Version 4rev1", Network Working Group, Available Online at <https://tools.ietf.org/html/rfc3501>, Mar. 2003, 109 pages.
Oracle, "Oracle Communications Messaging Server", 2015, 8 pages.
"SOLOR1.3: Distributed Search", Available Online at <https://wiki.apache.org/solr/DistributedSearch>, Last Edited on Apr. 28, 2014, 3 pages.

* cited by examiner

*Primary Examiner* — Jason G Liao
(74) *Attorney, Agent, or Firm* — Invoke

(57) ABSTRACT

A method includes storing a copy of information, corresponding to a data set, in each of a plurality of data formats, and determining one or more portions of a search criterion to be associated with one or more sets of one or more characteristics. For each portion, based on the associated characteristics, a search is executed on a copy of information stored in a particular data format using a corresponding search algorithm to obtain a set of intermediary search results. A set of final search results corresponding to the search criterion is determined based on two or more sets of intermediary search results.

22 Claims, 6 Drawing Sheets

MULTI-SYSTEM SEGMENTED SEARCH PROCESSING

TECHNICAL FIELD

The present disclosure relates to search processing. In particular, the present disclosure relates to multi-system segmented search processing.

BACKGROUND

An increasing amount of data, in the form of electronic mail, websites, documents, databases, and data files, is used by and accessible to a user. A search system is important for finding desired information from the large amount of data available.

Conventionally, various search systems exist. However each search system has its own limitations. A particular search system may be inaccurate, inefficient, or incapable of performing a particular search on a particular type of data.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
3. STORE COPIES OF INFORMATION IN MULTIPLE DATA FORMATS
4. DETERMINE SEARCH RESULTS USING MULTI-SYSTEM SEGMENTED SEARCH PROCESSING
5. EXAMPLE EMBODIMENT
6. MISCELLANEOUS; EXTENSIONS
7. HARDWARE OVERVIEW

1. General Overview

In an embodiment, copies of a data set are stored in different formats and/or using different data structures. The different data formats and/or different data structures are suitable for searching using different, respective search systems and/or search algorithms.

In one or more embodiments, a set of final search results corresponding to a search criterion is determined based on two or more sets of intermediary search results corresponding to two or more portions of the search criterion.

In one or more embodiments, determining the two or more sets of intermediary search results includes determining one or more characteristics associated with each portion or segment of a search criterion. Based on the characteristics associated with the each particular portion of the search criterion, a search system, a data format and/or a search are selected for searching for the particular portion of the search criterion.

In one or more embodiments, a set of final search results corresponding to a search criterion is determined by one or more logical combinations of two or more sets of intermediary search results. Depending on the logical relationship, the set of final search results may be, for example, search results that appear in any of the intermediary search results, or search results that appear in all the intermediary search results.

2. Architectural Overview

Figure 1:
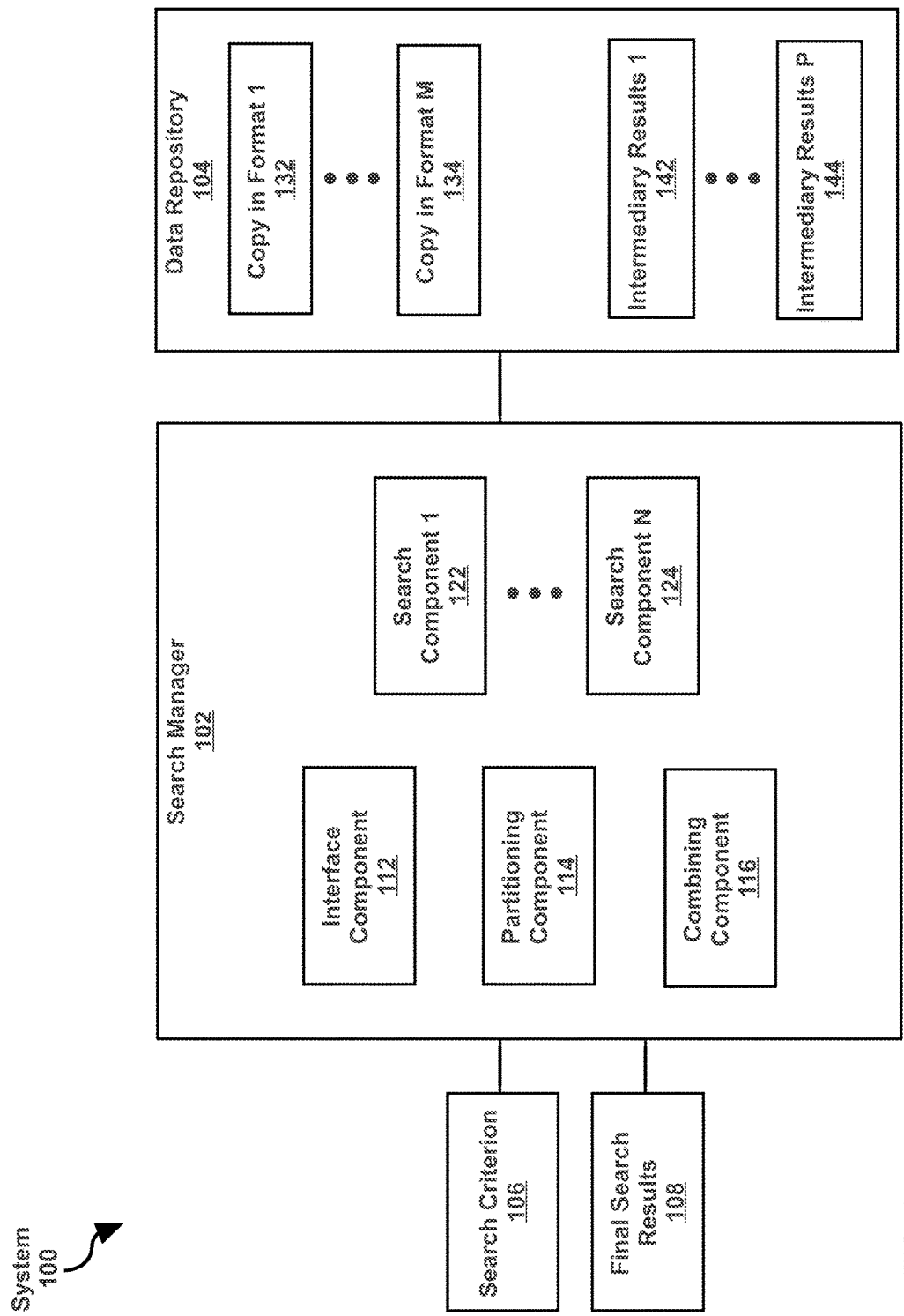
FIG. 1 illustrates a system in accordance with one or more embodiments.

FIG. 1 illustrates a system 100 in accordance with one or more embodiments. As illustrated in FIG. 1, system 100 includes a search manager 102 and a data repository 104. In one or more embodiments, system 100 may include more or less components, than the components illustrated in FIG. 1. The components illustrated in FIG. 1 may be local to or remote from each other. The components illustrated in FIG. 1 may be implemented in software and/or hardware and may be distributed over one or more applications and/or machines. Operations described with respect to one component may instead by performed by another component.

In an embodiment, search criterion 106 includes one or more attributes or parameters to be identified, by the search, in a data set. Attributes include, but are not limited to, words, text, phrases, rules, flags, and/or classifications, that a user desires to search for in a data set. A phrase includes two or more words in a specific order. A rule specifies a range of values, for example, a date range. A flag or classification specifies an attribute of a data set, for example, a read flag and a priority flag. Search criterion 106 may be partitioned into one or more portions, each of which includes one or more attributes to be identified in a data set.

In an embodiment, search criterion 106 includes one or more operations, which specify one or more logical relationships between portions of search criterion 106. Examples of binary operations include AND, OR, and XOR (exclusive OR). For example, an AND between two portions requires that attributes specified in both portions be found in a search result. An OR between two portions indicates that attributes specified in either one or the other or both portions are found in a search result. An XOR between two portions indicates that attributes specified in either one or the other, but not both, portions are found in a search result. Examples of unary operations include NOT. For example, a NOT preceding a portion of search criterion 106 indicates that attributes specified in the portion are not found in a search result. A NOT may also precede a portion that includes another operation, such as "NOT ('Java' AND 'computer')." The nested operation 'Java' AND 'computer' returns intermediary search results having both the words "Java" and "computer." The NOT reverses the intermediary search results, returning all items of a data set except the ones having both the words "Java" and "computer."

In an embodiment, search criterion 106 includes one or more search scopes, which are one or more fields within a data set where a search is executed. Search criterion 106 (or a portion thereof) may be searched for in the entire data set or in specific fields of the data set. Each field of the data set stores different types of information. For example, where the data set is an email system, fields may include "To" field (addressee), "From" field, "Date Sent," "Subject," "Message Body," "Attachments," "Priority Flag," "Read Flag," as well as other metadata. As an example, a user may desire to limit the scope of a search to the "Subject" field of the emails in his inbox.

In one or more embodiments, data repository 104 is any type of storage unit and/or device (e.g., a file system, database, collection of tables, or any other storage mechanism) for storing data. Further, data repository 104 may include multiple different storage units and/or devices. The multiple different storage units and/or devices may or may not be of the same type or located at the same physical site. Further, data repository 104 may be or may execute on the same computing system as search manager 102. Alternatively or additionally, data repository 104 may be on a separate computing system than search manager 102. Data repository 104 may be connected to search manager 102 via a direct connection or via a network.

In an embodiment, multiple copies of information stored in a data format 132-134, illustrated as being stored in data repository 104, correspond to a same data set. A data set is a collection of data, such as a file system, an email system, a document retrieval system, websites on the Internet, a text document, or a digital photo album. An item of a data set is a record or an element stored within the data set, such as a file of a file system, an email of an email system, or a word of a text document.

A data format is a particular data structure storing certain extracted information of a data set in a particular memory type. Different data formats are used by different search systems. Copies of information stored in different data formats 132-134 may be created by search manager 102, a component thereof, another application or module, or a combination of the above.

In an example, a data format is an inverted index. An inverted index is an index data structure storing a mapping from content of a data set, such as words or numbers, to its location in the data set. An inverted index may be a record level inverted index, which contains a list of references to records or documents for each word, or a word level inverted index, which additionally includes the positions of each word within a record or document. In an example, the information extracted from the data set and stored in an inverted index includes the content of files, records, or documents. Some or all of the metadata, such as flags, is not extracted and stored in the inverted index. In an example, an inverted index is used by a file search system written using Apache Lucene or another text search engine.

In an example, a data format is a non-clustered index. The data is present in arbitrary order, but the logical ordering is specified by the index. In another example, a data format is a clustered index. The data block is altered into a distinct order that matches the index.

In another example, a data format is a cached version of at least a portion of the data set that was recently accessed. The offset of each message's cache record is stored in an index file. In an example, the information extracted from the data set and stored in cache includes all the data that was recently accessed, including content and metadata. For example, when a flag is changed (such as, when a "Read Flag" is turned from on to off), the cache is updated to reflect the change. In an example, a cached version of the data set is used by a search system such as IMAPD, which provides an application to manage electronic mail. Other examples of data formats include but are not limited to a linked list, a vector, an array, a tree structure, and a table.

In an example, even though different information may be extracted from a data set for different data formats, the extracted information for a first data format at least partially overlaps with the extracted information for a second data format. There is redundancy in the copies of information stored in different data formats 132-134. In one example, while a flag of a message is extracted for the cached version of the data set but not the inverted index, the content of the message is extracted for both. In this particular example, a send date associated with the message is stored in the cached version of the data set and the inverted index in different formats.

In an embodiment, each of a set of intermediary search results 142-144, illustrated as being stored in data repository 104, identifies record(s) or item(s) in the data set matching at least a portion of search criterion 106. The intermediary search results 142-144 may identify an item that matches a portion of the search criterion at a record level, such as a file, email message, webpage, or document, and/or at a word level, such as a specific location within a file at which the match is found. The search results 142-144 identify items in the data set using a unique identifier for each item. For example, a record level identifier may be a document identification (ID) number. As another example, a word level identifier may be a word number and a document ID number. In an example, all sets of intermediary search results 142-144 refer to items in the data set using a uniform or common set of unique identifiers. In another example, each set of intermediary search results 142-144 refers to items in the data set using different sets of identifiers, which may subsequently be converted into a common set of identifiers.

In an embodiment, search manager 102 includes one or more digital devices configured to perform operations described herein for conducting multi-system search processing. The term "digital device" generally refers to any hardware device that includes a processor. A digital device may refer to a physical controller device or a hardware device executing a virtual machine (e.g., a virtual controller). Examples of digital devices include a computer, a tablet, a laptop, a desktop, a netbook, a server, a web server, a network policy server, a mainframe, a television, a content receiver, a set-top box, a video gaming console, a printer, a mobile handset, a smartphone, and/or a personal digital assistant ("PDA"). In an example, search manager 102 is in communication with data repository 104.

In an embodiment, search manager 102 includes an interface component 112, a partitioning component 114, a combining component 116, and multiple search components 122-124. Each component may be implemented in software and/or hardware and may be distributed over one or more applications and/or machines, which may be local to or remote from each other.

In an embodiment, interface component 112 refers to hardware and/or software configured to receive input to search manager 102 and to return output from search manager 102. Interface component 112 includes functionality for presenting any type of visual, audio, tactile, or other sensory information generated by search manager 102. Interface component 112 may include a keyboard, a touchscreen, a microphone, or another input device. In an embodiment, interface component refers to displayed elements within a graphical user interface that are configured to accept input. For example, interface components may include text fields, radio boxes, check boxes, and/or dropdown menus, through which a user may enter user input.

Interface component 112 receives search criterion 106 from a user and presents search criterion 106 to other components of search manager 102. Interface component 112 returns a set of final search results 108 corresponding to search criterion 106, which is described herein. Interface component 112 may return the set of final search results 108 via a screen, a speaker, a printer, or another output device. A user interface that is used to receive input may be the same as or different from a user interface that is used to return output. A user interface may be local to or remote from search manager 102. Interface component 112 also interacts with partitioning component 114 and combining component 116.

In an embodiment, partitioning component 114 is configured to partition search criterion 106 into one or more portions or segments. For example, a search criterion is "('King David' OR Daniel) AND (date=January 1, 2015)." Examples of portions include "King David," "(date=January 1, 2015)," and "David." Each portion of search criterion 106 is associated with one or more characteristics based on the type of attributes being identified, operations, and/or scopes included in search criterion 106 (or portion thereof). A characteristic of a particular portion of search criterion 106 identifies copies of information stored in one or more data formats that are suitable for being used in executing a search for the particular portion of search criterion 106. Portions of search criterion 106 are distributed to multiple search components 122-124 by partitioning component 114.

In an embodiment, each search component 122-124 refers to hardware and/or software configured to execute a search on a copy of information stored in a particular data format 132-134. A particular search component refers to executable code for using a particular search algorithm to search for a portion of search criterion 106. Each search component 122-124 may be operated sequentially or in parallel with respect to each other. Each search component 122-124 may operate independently of each other. In an example, each portion of search criterion 106 is presented to a different search component 122-124. In another example, more than one portion of search criterion 106 may be presented to the same search component 122-124.

In an embodiment, each search component 122-124 includes a different set of algorithms, procedures, protocols, routines, or mechanisms to identify a record or item in a data set that matches search criterion 106 (or a portion thereof). A particular search component may be more suitable for searching a first portion of search criterion 106 associated with a first characteristic than a second portion of search criterion 106 associated with a second characteristic.

In an example, a search component 122 is configured to apply a hash table look up. A hash function maps a portion of search criterion 106 to an index of an array, such as a copy of information stored as an inverted index. The hash table look up is suitable for searching for relatively static content of a data set, such as the content of emails. However, dynamically changing information, such as a read flag of an email, needs to be processed and reflected in an updated inverted index, in order for the hash table look up to be accurate. For example, Apache Lucene or other text search engines utilize a hash table look up.

In an example, a search component 122 is configured to apply a look up of a clustered index. A look up of a clustered index is suitable for accessing data sequentially in the same order or reverse order of the clustered index, or for accessing a range of items. For example, a look up of a clustered index of sent dates of emails is suitable for conducting a search for all emails sent between Jan. 1, 2015, and Jan. 31, 2015. In another example, a search component 122 is configured to apply a look up of a non-clustered index. In an example, a search component 122 is configured to apply a linear search to a cached version of the information of a data set. This linear search of the cache is suitable for searching dynamically changing information, as the cache maintains the most updated version of information. However, the linear search is not suitable for searching large amounts of content because traversal of each record in the data set is relatively slow. For example, an IMAPD email system utilizes a traversal of a cached version of a data set.

Another example of a search algorithm used in search component 122 is locality sensitive hashing (LSH), which is suitable for searching for a nearest neighbor (a point closest or most similar to a portion of search criterion 106). Other examples of search algorithms include but are not limited to a binary search that traverses the data set starting from the middle of the data set, and a tree search.

In an embodiment, each search component 122-124 executes a search in a copy of information stored in a particular data format 132-134 corresponding to the search algorithm used. For example, a copy of information stored as an inverted index corresponds to a hash table look up search algorithm. The number of search components 122-124 may be the same as or different from the number of copies of information stored in different data formats 132-134. In an example, each search component 122-124 uses a different data format 132-134. In another example, multiple search components 122-124 may execute a search on a copy of information in the same data format 132-134.

In an embodiment, each search component 122-124 returns a set of intermediary search results 142-144, illustrated in data repository 104 for purposes of explanation, for the portion of search criterion 106 being searched. The number of search components 122-124 that are used to execute a search for search criterion 106 may be the same as or different from the number of sets of intermediary search results 142-144. The set of intermediary search results 142-144 may be presented to combining component 116.

In an embodiment, combining component 116 corresponds to hardware and/or software configured to determine a set of final search results 108 based on the sets of intermediary search results 142-144. A set of final search results 108 is a combination of sets of intermediary search results 142-144 based on one or more logical relationships between the sets of intermediary search results 142-144. The logical relationship between sets of intermediary search results 142-144 is determined based on how search criterion 106 was partitioned by partitioning component 114.

In an embodiment, a set of final search results 108 identifies each record or item in the data set matching search criterion 106. Similar to a set of intermediary search results 142-144, the set of final search results 108 may identify an item that matches search criterion 106 at a record level, such as a file, email message, webpage, or document, and/or at a word level, such as a specific location within a file at which the match is found. The search results 108 identify items in the data set using a unique identifier for each item. In an example, if the sets of intermediary search results 142-144 use a uniform system of identifiers, then the set of final search results 108 may use the same uniform system of identifiers to reference items in the data set. In another example, the set of identifiers used by the sets of intermediary search results 142-144 may be different from the set of identifiers used by the set of final search results 108.

3. Store Copies of Information in Multiple Data Formats

Figure 2:
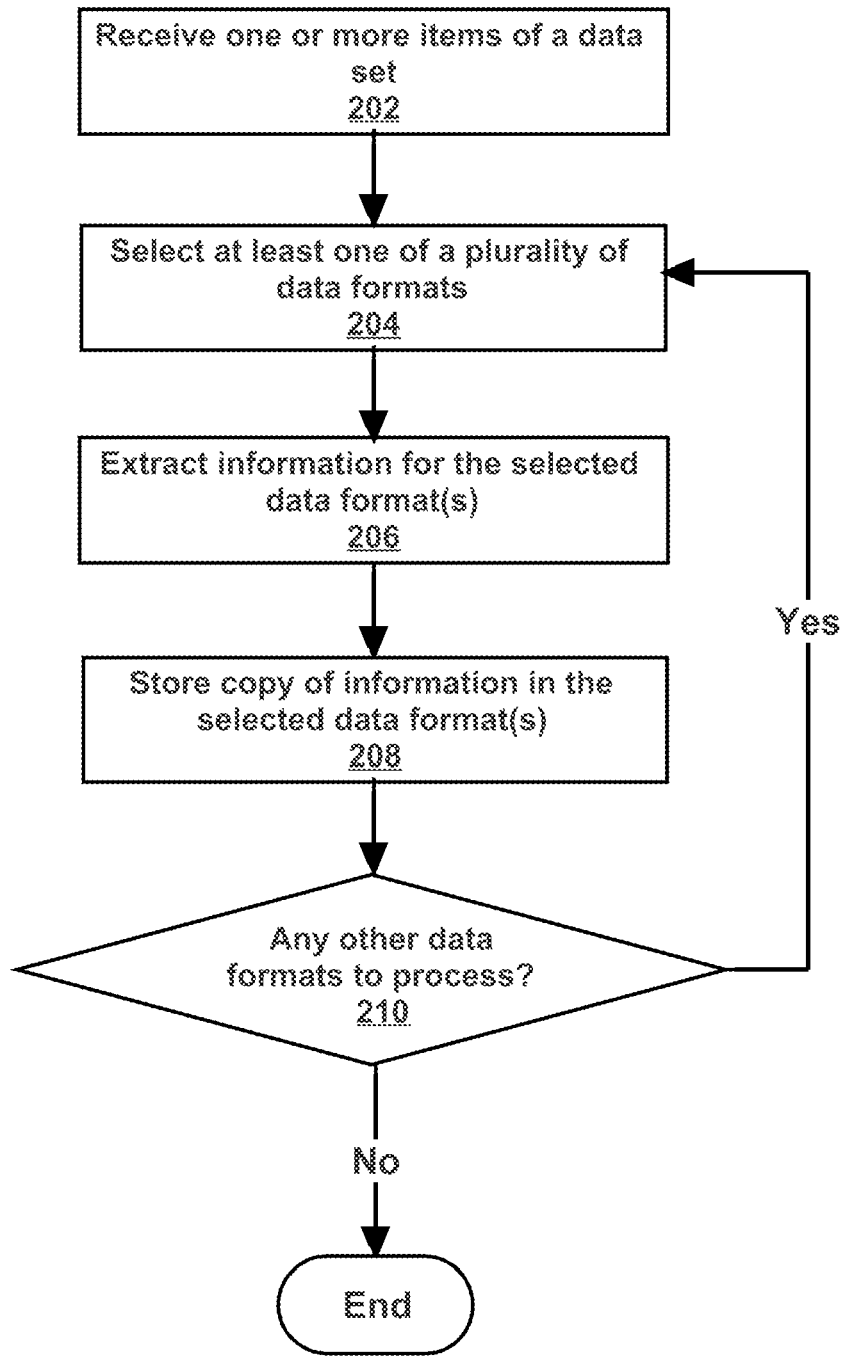
FIG. 2 illustrates an example set of operations for storing copies of information in multiple data formats in accordance with one or more embodiments.

FIG. 2 illustrates an example set of operations for storing copies of information in multiple data formats in accordance with one or more embodiments. Operations as described herein with reference to FIG. 2, may be omitted, rearranged, or modified. Furthermore, operations may be added or performed by different components or devices. Accordingly, the specific set or sequence of operations should not be construed as limiting the scope of any of the embodiments.

Initially, one or more records or items of a data set are received by a system (Operation 202). One or more items of a data set may be received from user input entered at a user interface or from another device, and may be received using a data pull or a data push. One or more items of a data set may be received by a system for processing into a data format due to various triggering events.

In an embodiment, items of a data set are received by the system when the items are added to the data set. In one example, a data set is defined as a set of emails for Joe Smith stored on an email server. When Joe Smith receives a new email, the new email is added to the set of emails for Joe Smith that are stored on the email server. In another embodiment, the items of a data set are received by the system when the items are accessed, retrieved, or read by a user or another device. In an example, a data set is defined as a subset of the emails for Joe Smith that Joe Smith has accessed, or that an email client, executing on Joe Smith's laptop, has retrieved from an email server.

In an embodiment, at least one of a plurality of data formats is selected for storing the received item of the data set (Operation 204). Selecting the data format is based on determining that the data format is suitable for the type of data associated with the received item. An inverted index is suitable for storing text-based data. A cached version of the data set is suitable for storing dynamically changing and/or frequently accessed data. A clustered index is suitable for storing data that is retrieved sequentially. In an example, a received item of a data set is an email in a set of emails being sent to Joe Smith. The email includes text-based data, such as the message body of the email. The email also includes dynamically changing data, such as a read flag of the email. Hence, at least an inverted index and a cached version of the data set are selected as data formats for storing the email.

In an embodiment, information is extracted from the received item and/or the data set for storage in the selected data format(s) (Operation 206). All or only some of the information of the data set may be extracted. The same or different information may be extracted for each of the multiple data formats. In an example, the information extracted from the data set for a first data format overlaps with the information extracted from the data set for a second data format. There is redundancy in the copies of information stored in different data formats. For example, a subject, message body, and flags of an item are extracted from a data set for a first data format, while only a subject and message body, but not flags, of an item are extracted from the data set for a second data format. The information is extracted through parsing the data set, which may include converting the data set into plain text, stripping HTML markup, stripping arbitrary or repeating text.

In an embodiment, extraction of information for multiple different data formats is performed independently of each other. Extraction of information for multiple different data formats may run sequentially or simultaneously with each other. Extraction of information for multiple different data formats may be triggered by different events. In an example, a selected data format is a cached version of the data set. Extraction of information for the cache is performed when a modification to one or more records of the data set is made. In another example, a selected data format is an inverted index of the data set. Extraction of information for the inverted index is performed when one or more new records are added to the data set.

In an embodiment, the extracted information corresponding to the data item is stored in the selected data format(s) (Operation 208). The extracted information may be transformed, converted, or processed so that it conforms to a data structure suitable for a selected data format. In an example, the extracted information is indexed. For example, messages of an email system are stored in a cache, and the offset of each message's cache record is stored in an index file. In another example, the extracted information is broken down into indexing elements. An indexing element may be a word in the data set (for example, "bikes"), or a stem of a word in the data set (for example, "bike" rather than "bikes"). Common words that do not add contextual value (for example, "a," "the," and "and") may be removed from a list of indexing elements. Synonyms to a word in the data set may be added as an indexing element. In another example, headers, checksums, and other data are added to the extracted information. In another example, a data format stores information in the form of a table, linked lists, and/or pointers. The copy of information in the selected data format(s) is stored at one or multiple memories or data storages, which may include built-in redundancy.

Subsequent to storing a copy of information in at least one data format, a determination is made as to whether the data set is to be stored in any additional data formats (Operation 210). If the data set is to be stored in an additional data format, the process restarts at Operation 204 for the additional data format.

4. Determine Search Results Using Multi-System Segmented Search Processing

In an embodiment, a set of final search results for a search criterion is determined using a two-step multi-system segmented search processing. In a first step, described below with reference to FIG. 3, a search criterion is partitioned into multiple segments for executing respective searches. In a second step, described below with reference to FIG. 4, a search is executed for each segment to obtain intermediary search results which are then combined to determine a set of final search results.

Figure 3:
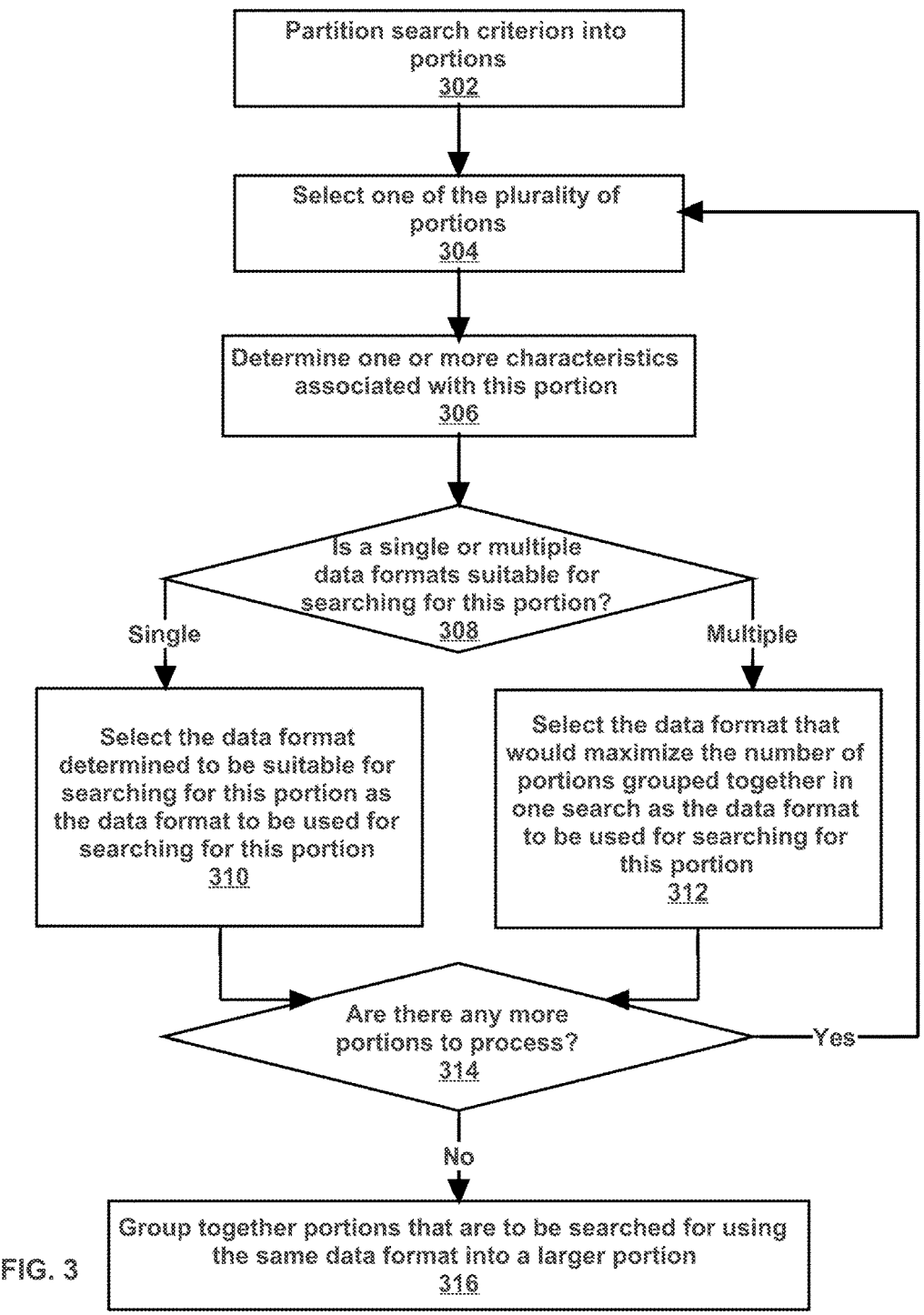
FIG. 3 illustrates an example set of operations for partitioning the search criterion into multiple segments for executing respective searches in accordance with one or more embodiments.

FIG. 3 illustrates an example set of operations for partitioning the search criterion into multiple segments for executing respective searches in accordance with one or more embodiments. Operations as described herein with reference to FIG. 3, may be omitted, rearranged, or modified. Furthermore, operations may be added or performed by different components or devices. Accordingly, the specific set or sequence of operations should not be construed as limiting the scope of any of the embodiments.

Initially, a search criterion is partitioned into one or more portions (Operation 302). In one example, partitioning includes receiving a search criterion in a search field, and tokenizing the search criterion to obtain character arrays such that each character array corresponds to a portion of the search criterion. In another example, a search criterion is a combination of various inputs and each input is partitioned into a respective portion. The search criterion is generated by a user (a) entering "Bob" into a search field for searching email and (b) selecting a checkbox for attachments. The search criterion is partitioned into a first portion corresponding to the search field input and a second portion corresponding to the checkbox for attachments. The first portion represents a search for all emails with the name "Bob" included in the email and the second portion represents a search for all emails with attachments.

In another example, portions of a search criterion are separated by logical operators. A search criterion regarding the Italian artist and scientist Leonardo da Vinci is "'Leonardo da Vinci' AND (Italy OR Europe) AND artist." A portion of this search criterion may be "Leonardo da Vinci," "Italy," "Italy OR Europe," "(Italy OR Europe) AND artist," or any other segment of the search criterion.

In another example, different search scopes included in a search criterion are partitioned into different portions. A search criterion is "has:attachments subject:turtles." Then a first portion is "has:attachments," corresponding to a search scope of the attachments field. A second portion is "subject:turtles," corresponding to a search scope of the subject field.

In an embodiment, one of the plurality of portions is selected to be processed (Operation 304). In one example, the portion is selected in order of the sequence in which the portion appears in the search criterion. For example, a portion that appears first in the search criterion is first selected for processing. In another example, the portion is selected based on the complexity of the portion. For example, in the search criterion above, the portion "artist" is less complex than the portion "Italy OR Europe." In another example, a portion is selected based on an estimate number of search results for that portion. A portion that specifies specific or rare attributes is first selected for processing. For example, in the search criterion above, the portion "Leonardo da Vinci" is likely to return a smaller set of intermediary search results.

In an embodiment, one or more characteristics associated with a selected portion of the search criterion are determined (Operation 306). In an example, a characteristic indicates one or more data formats that are suitable to be used for searching for the selected portion of the search criterion. Each portion is compared to a lookup table, which matches the portion to one or more characteristics. For example, a lookup table indicates that a portion searching for a "Flag" is suitable for a search executed in a copy of information stored in a cache. Since a flag of a record in a data set may be frequently varied or updated by a user, the cache memory stores the most recent change to the flag, and the cached version of the data set is suitable for searching flags. On the other hand, an inverted index is not updated as frequently or quickly and may not reflect the most recent change to the flag.

As another example, a lookup table indicates that a portion searching for certain text in "Message Body" is suitable for a search executed in a copy of information stored in an inverted index. The inverted index provides a quick hash lookup table that locates a word in a text file or a set of text files, thus the inverted index is suitable for searching a large body of text such as the message body. Meanwhile, text in "Message Body" is not stored in the cache memory. Text in "Message Body" is stored in persistent storage. Each record stored in the persistent storage is traversed in a search, and a search over a large body of text in the persistent storage is inefficient.

As another example, a lookup table indicates that a portion searching for text in "Subject" is suitable for both a search executed in a copy of information stored in a cache and a search executed in a copy of information stored in an inverted index. Text in the "Subject" field of a record of a data set is indexed in an inverted index. Further, text in the "Subject" field is of a manageable size for traversal of each record in the cache memory. Thus, both data formats are suitable.

In another example, a characteristic of a portion indicates the computational complexity of executing a search for the portion in a copy of information stored in one or more data formats. If the computational complexity associated with a particular data format is below a threshold, then the particular data format is suitable for being used. A computational complexity may be represented using a Big O notation (such as, "$O(n)$"). For example, a portion of a search criterion searches for text in the "Subject" field. A computation complexity of searching for text in the "Subject" field in a copy of information stored in an inverted index is an average of $O(1)$. A computational complexity of searching for text in the "Subject" field in a cached version of the data set is an average of $O(n)$, where "n" is the number of messages. If n is small, then the computational complexity for the inverted index and for the cached version of the data set are similar. Both the inverted index and the cached version of the data set are suitable for being used to search for text in the "Subject" field. However, if n is large, then the computational complexity for the cached version of the data set is greater than the computational complexity for the inverted index. The inverted index is suitable for being used to search for text in the "Subject" field, but the cached version of the data set is not.

In an embodiment, based on the characteristics associated with a portion of the search criterion, an inquiry is made as to whether a single or multiple data formats are suitable for searching for the selected portion (Operation 308).

In an embodiment, if a single data format is identified as suitable for searching for a selected portion of the search criterion, then the data format that is suitable for searching for this portion is selected as the data format to be used for searching for this portion (Operation 310).

In an embodiment, if multiple data formats are identified as suitable for searching for a selected portion of the search criterion, then the data format that would maximize the number of portions grouped together in one search is selected as the data format to be used for searching for this portion (Operation 312). The selection of a data format for a particular portion of a search criterion depends on the data formats that are suitable to be used for searching for other portions of the search criterion. Portions can be grouped together in one search if the portions are suitable to be searched for using a common data format. For example, if a first portion of a search criterion uses a particular data format, then other portions of the search criterion that are suitable to be searched for using the particular data format can be grouped together with the first portion to form a larger portion.

As another example, a first data format is the single data format that is suitable for searching for a first portion of a search criterion, while the first data format or a second data format is suitable for searching for a second portion of the search criterion. By selecting the first data format as the data format to be used for searching for the second portion, the first portion and the second portion share a common data format. The first portion and the second portion can be grouped together as one larger portion that can be searched in a single execution of a search that uses the first data format.

In an embodiment, subsequent to selecting a data format to be used for a selected portion of the search criterion at Operation 310 or Operation 312, a determination is made as to whether any portions of the search criterion remain unprocessed (Operation 314). If a portion remains unprocessed, the process restarts at Operation 304 for the remaining portion. According the process is iterated for each portion of the search criterion.

In an embodiment, if all portions of the search criterion are processed, portions that are to be searched using the same data format are grouped together to form a larger portion (Operation 316). Depending on the search criterion, all, some, or none of the portions of the search criterion may be grouped together. In an example, all portions that are to be searched using the same data format are grouped together. For example, a search criterion has three portions: (1) message body includes the phrase "Leonardo da Vinci," (2) subject includes the word "Italy," and (3) last retrieved date is Jan. 1, 2015. A copy of information stored in an inverted index is selected for searching for emails with the phrase "Leonardo da Vinci" as well as for searching for emails with a subject that includes "Italy," since both portions involve a text search. A copy of information stored in a cache is selected for searching for emails with a last retrieved date of Jan. 1, 2015, since the last retrieved date is an attribute that is dynamic. Accordingly, the first portion and the second portion are grouped together as one larger portion.

In another example, one or more portions that are to be searched using the same data format are selected for being grouped together based on the logical relationships between the portions. The logical relationships between portions may or may not allow those portions to be processed in a single execution of a search. For example, a search criterion is "(first portion OR second portion) AND (third portion OR fourth portion)." A first data format is determined to be the data format to be used for searching for the first portion, the second portion, and the fourth portion. However, an order of operations specified in the search criterion requires that the third portion and the fourth portion be searched before being combined with other portions of the search criterion. Since the first portion, the second portion, and the third portion cannot be searched together, these portions are not grouped together.

In an example, the maximum number of portions that use the same data format and can be searched together in a single execution of a search are grouped together. Thus, the number of executions of searches is reduced. For example, a search criterion is "first portion OR second portion OR third portion." A first data format is determined to be the data format to be used for searching for the first portion, the second portion, and the third portion. If only the first portion and the second portion are grouped together, then a first search is executed for the first portion and the second portion, and a separate second search is executed for the third portion. If however the first portion, the second portion, and the third portion are grouped together, then a single search is executed. Thus, the maximum number of portions that use the same data format and can be searched together includes the first portion, the second portion, and the third portion.

Figure 4:
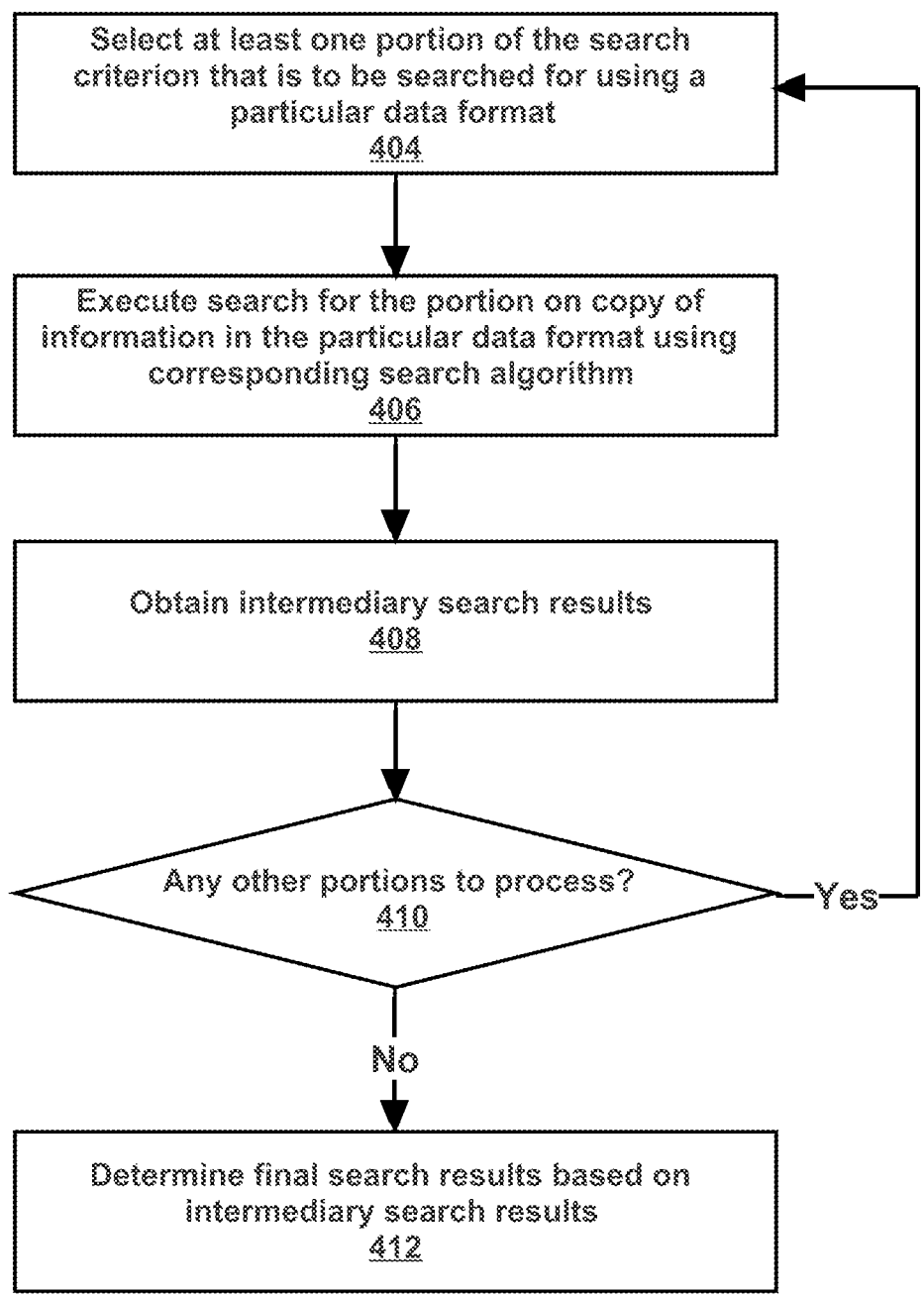
FIG. 4 illustrates an example set of operations for executing multiple searches, each search for a portion of the search criterion, in accordance with one or more embodiments.

FIG. 4 illustrates an example set of operations for executing multiple searches, each search for a portion of the search criterion, in accordance with one or more embodiments. Operations as described herein with reference to FIG. 4, may be omitted, rearranged, or modified. Furthermore, operations may be added or performed by different components or devices. Accordingly, the specific set or sequence of operations should not be construed as limiting the scope of any of the embodiments.

Initially, at least one of the portions of the search criterion is selected for searching in a copy of the data set in the corresponding data format (Operation 404). The selected portion may refer to any portion of the search criterion, such as a portion that is identified through tokenization at Operation 302, or a larger portion composed of smaller portions that are to be searched for using the same data format identified at Operation 316.

In one example, the portion is selected in order of the sequence in which the portion appears in the search criterion. In another example, the portion is selected based on the complexity of the portion. In another example, a portion is selected based on an estimate number of search results for that portion. A portion that specifies specific or rare attributes is first selected for processing.

In an embodiment, one or more searches are executed for the selected portion of the search criterion on a copy of information stored in the particular data format using a corresponding search algorithm (Operation 406). In an example, multiple searches are executed for multiple portions, and the multiple searches are performed concurrently. For example, a first search on a first portion of the search criterion is executed at the same time as a second search for a second portion of the search criterion. The process for obtaining a first intermediary set of search results from the first search does not depend on the process for obtaining a second intermediary set of search results from the second search. In another example, multiple searches are executed sequentially.

In an embodiment, a search algorithm is selected based on the particular data format to be used for the selected portion. For example, an inverted index of a data set corresponds to a hash lookup search algorithm. A hash lookup is used in, for example, a file search system using Apache Lucene, which is a text search engine library written in Java. As another example, a cached version of a data set corresponds to a traversal of each item or record stored in the cache. Traversal of each item or record stored in the cache is used in, for example, an IMAPD email system.

In an embodiment, a set of intermediary search results for each of the portions of the search criterion is obtained from each execution of a search (Operation 408). A set of intermediary search results includes identifiers or references to items or records in a data set that match the portion of the search criterion. In an example, each set of intermediary search results, corresponding to different portions of the search criterion, references items in a data set using a uniform or common identification system. In another example, each set of intermediary search results references items in a data set using a different identification system, which may be converted or translated into a uniform identification system. By using a uniform identification system, each item in a data set is referenced in the same manner in each of the sets of intermediary search results.

In an embodiment, subsequent to obtaining one or more sets of intermediary search results, a determination is made as to whether any portions of the search criterion remain unprocessed (Operation 410). If a portion remains unprocessed, the process restarts at Operation 404 for the remaining portion. According the process is iterated for each portion of the search criterion.

In an embodiment, if all portions of the search criterion are processed, a set of final search results is determined based on the multiple sets of intermediary search results (Operation 412). A set of final search results is determined based on the sets of intermediary search results and one or more logical relationships between the sets of intermediary search results. The logical relationship between the sets of intermediary search results is based on the logical relationships between respective portions of the search criterion.

In an example, a particular logical relationship is specified between a first portion of search criterion and a second portion of search criterion. A first set of intermediary search results is obtained for the first portion of search criterion, and a second set of intermediary search results are obtained for the second portion of search criterion. The first set of intermediary search results and the second set of intermediary search results are combined using the same particular logical relationship, in order to obtain a set of final search results.

In an example, a logical relationship between two sets of intermediary search results is an AND operation. Then a final set of search results includes each item that was referenced in both sets of intermediary search results. In another example, a logical relationship between two sets of intermediary search results is an OR operation. Then a final set of search results includes each item that was referenced in either of the sets of intermediary search results. The set of final search results may be presented at a user interface.

In an embodiment, a set of final search results is determined based on multiple combinations of sets of intermediary search results. In an example, each combination combines two sets of intermediary search results. Thus additional combinations are performed when more than two sets of intermediary search results were obtained through the iteration of multiple searchers at Operations 404-410. In an example, three sets of intermediary search results are obtained. A temporary list of identifiers of items in the data set is determined based on a first combination of the first set of intermediary search results and the second set of intermediary search results. Then a set of final search results 108 is determined based on a second combination of this temporary list of identifiers and the third set of intermediary search results.

5. Example Embodiment

Figure 5:
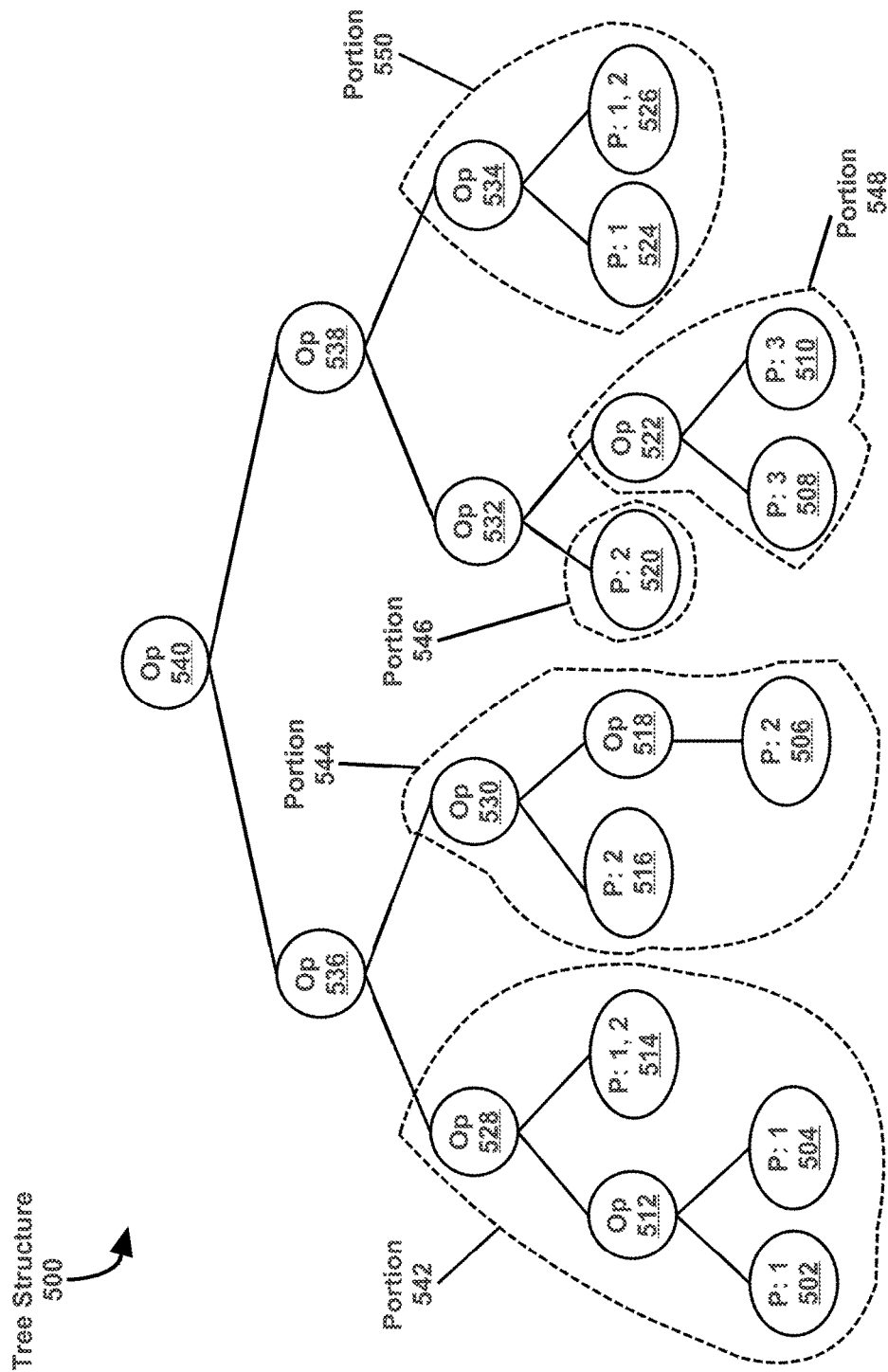
FIG. 5 illustrates an example of executing a multi-system segmented search on a search criterion that is structured as a tree, in accordance with one or more embodiments.

FIG. 5 illustrates an example of executing a multi-system segmented search on a search criterion that is structured as a tree, in accordance with one or more embodiments. FIG. 5 shows a tree structure 500. The tree structure includes nodes 502-540. Each node 502-540 corresponds to a portion ("P") of a search criterion or an operation ("Op") of a search criterion. A node may have a parent and/or one or more children. A node with no parent is called a root. A node with no children is called a leaf.

In an example, a search criterion includes ten portions, for example, "(((first portion AND second portion) OR third portion) AND (fourth portion AND NOT fifth portion)) AND ((sixth portion OR (seventh portion OR eighth portion)) OR (ninth portion AND tenth portion))." An order of operation for each portion is specified by the search criterion and is reflected in tree structure 500, wherein leaves 502-510, 514, 516, 520, 524, 526 correspond to each of the ten portions, respectively. For example, the search criterion specifies that the operation "(first portion AND second portion)" is performed prior to combining with other portions. Thus, tree structure 500 stores nodes 502 and 504, corresponding to the first portion and the second portion, as two children of the same node 512, corresponding to the AND operation between the first portion and the second portion. Similarly, the search criterion specifies that the operation "OR third portion" is performed after the operation "(first portion AND second portion)" but prior to combining with other portions. Thus, tree structure 500 stores node 512, corresponding to the AND operation between the first portion and the second portion, and node 514, corresponding to the third portion, as two children of the same node 528, corresponding to the OR operation. In an example, tree structure 500 may be simplified, transformed, or otherwise modified, while maintaining consistency with a given search criterion.

Initially, the search criterion is partitioned into portions. For each portion (indicated by "P"), one or more associated characteristics is determined, and the characteristics indicate one or more data formats suitable for the portion. For example, each portion is suitable to be searched for in a copy of information stored in a first data format (indicated by "1"), a second data format (indicated by "2"), and/or a third data format (indicated by "3"). For example, the first portion at node 502 is suitable to be searched for in a copy of information stored in the first data format, and the third portion at node 514 is suitable to be searched for in a copy of information stored in the first data format and in a copy of information stored in the second data format.

The portions are grouped together into larger portions 542-550, each of which is to be processed in a single execution of a search using a same data format. By identifying larger portions, the number of executions of searches is reduced.

In order to identify the largest portion of the search criterion that can be searched together, tree structure 500 is processed starting from the bottom, referred to herein as the leaves. For example, the seventh portion at node 508 and the eighth portion at node 510 are first selected. It is determined that these nodes 508-510 are suitable to be searched using the same data format (for example, the third data format). Going up tree structure 500, the sixth portion at node 520 is next selected. It is determined that node 520 is suitable to be searched using a data format different from that of nodes 508-510 (for example, the second data format). Thus, the largest portions that can be searched together is (1) a portion 548 including nodes 508-510, and (2) another portion 546 including node 520. Portion 546 is an example of a portion that is composed of a single node.

Thus the largest sub-tree, wherein each portion in the sub-tree is suitable to be searched for using a common data format, is identified. A sub-tree root node is the node at the topmost level of the sub-tree. A sub-tree includes every descendant of the sub-tree root. The largest sub-tree forms a portion of a search criterion that is to be searched in a single search execution using a particular data format. In this example, portions 542-550 are sub-trees, and nodes 528-534 are respective sub-tree roots.

Further, in order to identify the largest portion of the search criterion that can be searched together, if multiple data formats are suitable for a particular portion, then a data format is selected from the multiple suitable data formats such that the number of portions grouped together in one search is maximized. For example, the ninth portion at node 524 and the tenth portion at node 526 are selected. It is determined that node 524 is suitable to be searched using the first data format, and node 526 is suitable to be searched using the first data format and the second data format. If the second data format is selected for node 526, then nodes 524 and 526 would form two separate portions, with the portion of node 524 using the first data format and the portion of node 526 using the second data format. If the first data format is selected for node 526, then nodes 524 and 526 form one portion 550, and a single search using the first data format can be executed. Similarly, as another example, starting from the bottom of tree structure 500, it is determined that the first portion at node 502 and the second portion at node 504 are suitable to be searched using the first data format. It is further determined that the third portion at node 514 is suitable to be searched using the first data format and the second data format. If the first data format is selected, then nodes 502, 504, and 514 can be grouped together, to be processed in a single search using the first data format. Thus the number of portions grouped together in maximized.

After portions 542-550 are identified, a search is executed for each portion 542-550. Each search is executed on a copy of information stored in a data format that is suitable for the respective portion 542-550. Further, each search is executed using a search algorithm corresponding to the respective portion 542-550. Searches may be run sequentially or simultaneously. Each search returns a set of intermediary search results. In this example, five sets of intermediary search results are returned for the five portions 542-550.

A set of final search results are determined based on the sets of intermediary search results. One or more combinations of sets of intermediary search results may be made. Sets of intermediary search results are combined starting from the bottom of tree structure 500. For example, portions 546-548 are first selected as being on the lowest levels of tree structure 500. In this example, portions 546 and 548 correspond to "((sixth portion OR (seventh portion OR eighth portion))" of the search criterion. Thus portion 546 (including the sixth portion) and portion 548 (including the seventh portion and the eighth portion) are related using an OR operation. Accordingly, each item that is referenced in either (a) the set of intermediary search results obtained from portion 546 or (b) the set of intermediary search results obtained from portion 548 are selected as a temporary list. Then, moving up tree structure 500, portion 550 is selected. In this example, portions 546, 548, and 550 correspond to "(sixth portion OR (seventh portion OR eighth portion)) OR (ninth portion AND tenth portion)" of the search criterion. Thus portions 546-548 (including the sixth portion, the seventh portion, and the eighth portion) and portion 550 (including the ninth portion and the tenth portion) are related using an OR operation. Accordingly, each item that is referenced in either (a) the temporary list of items obtained from combining sets of intermediary search results from portions 546-548 or the set of intermediary search results obtained from portion 550 is selected as another temporary list. Finally, moving to the root 540 of tree structure 500, (a) the temporary list of items from portions 542-544 and (b) the temporary list of items from portions 546-550 are combined to determine a set of final search results. In this example, portions 542-544 and portions 546-550 are related using an AND operation. Accordingly, each item appearing in both temporary lists are selected as the set of final search results.

In another example, a search criterion, over a user's set of emails stored on an email server, is "(Body:Meeting) AND (ReadFlag:No) AND (SendDate: January 1, 2015 OR ReceivedDate: January 1, 2015)." The search criterion is partitioned into portions based on the logical operators in the search criterion. Thus, a first portion is "Body:Meeting," corresponding to a search for the word "Meeting" in message body of an email. A second portion is "ReadFlag:No," corresponding to a search for an email that is unread (the Read Flag is negative). A third portion is "SendDate: January 1, 2015," corresponding to a search for an email that is sent on Jan. 1, 2015. A fourth portion is "ReceivedDate: January 1, 2015," corresponding to a search for an email that is received on Jan. 1, 2015.

Characteristics of each portion are identified. A lookup table indicates that a text search in the message body is suitable to be performed in a copy of information stored in an inverted index. A search of the Read Flag is suitable to be performed in a copy of information stored in a cache. A search of the Send Date is suitable to be performed in a copy of information stored in an inverted index and a copy of information stored in a cache. A search of the Send Date is suitable to be performed in a copy of information stored in an inverted index and a copy of information stored in a cache.

A single data format, the inverted index, is suitable for the first portion, "Body:Meeting," and thus a copy of information stored in the inverted index is to be used for a search of the first portion. Similarly, a single data format, the cached version of the data set, is suitable for the second portion, "ReadFlag:No," and thus a copy of information stored in the cache is to be used for a search of the second portion.

Multiple data formats are suitable for the third portion, "SendDate: January 1, 2015," and fourth portion, "ReceivedDate: January 1, 2015." A selection from these multiple data formats is made such that a maximum number of portions may be combined in a single search. If the inverted index is selected for "SendDate: January 1, 2015," and the cached version of the data set is selected for "ReceivedDate: January 1, 2015," then two searches would need to be executed. If, however, the cached version of the data set is selected for both "SendDate: January 1, 2015" and "ReceivedDate: January 1, 2015," then a single search would be executed for both portions. Thus, a copy of information stored in the cache is selected for both portions.

Portions that can be grouped together into a single search are combined to form larger portions. Since the cached version of the data set is selected for "SendDate: January 1, 2015" and "ReceivedDate: January 1, 2015," these two portions are combined. Looking further at the second portion, the cached version of the data set has also been selected for "ReadFlag:No." A single search in the cached version of the data set may be executed on all three portions. Thus, "ReadFlag:No," "SendDate: January 1, 2015," and "ReceivedDate: January 1, 2015," as well as the corresponding logical operators, are combined to form one larger portion, "(ReadFlag:No) AND (SendDate: January 1, 2015 OR ReceivedDate: January 1, 2015)."

A search is executed on each portion, using a search algorithm corresponding to the data format that has been selected for the portion. A search algorithm corresponding to an inverted index is a hash table lookup. A search algorithm corresponding to a cached version of the data set is a linear search. Thus, a hash table lookup is performed on the first portion, "Body:Meeting." A first intermediary set of search results are obtained, including a first email, a second email, and a third email. Also, a linear search is performed on the large portion, "(ReadFlag:No) AND (SendDate: January 1, 2015 OR ReceivedDate: January 1, 2015)." A second intermediary set of search results are obtained, including the first email, the second email, and a fourth email.

The intermediary sets of search results are combined to determine a final set of search results. A logical operator linking the portions "Body:Meeting" and "(ReadFlag:No) AND (SendDate: January 1, 2015 OR ReceivedDate: January 1, 2015)" is AND. Thus, the final set of search results include search results that appear in both the first intermediary set of search results and the second intermediary set of search results. The final set of search results includes the first email and the second email, but not the third email and the fourth email.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
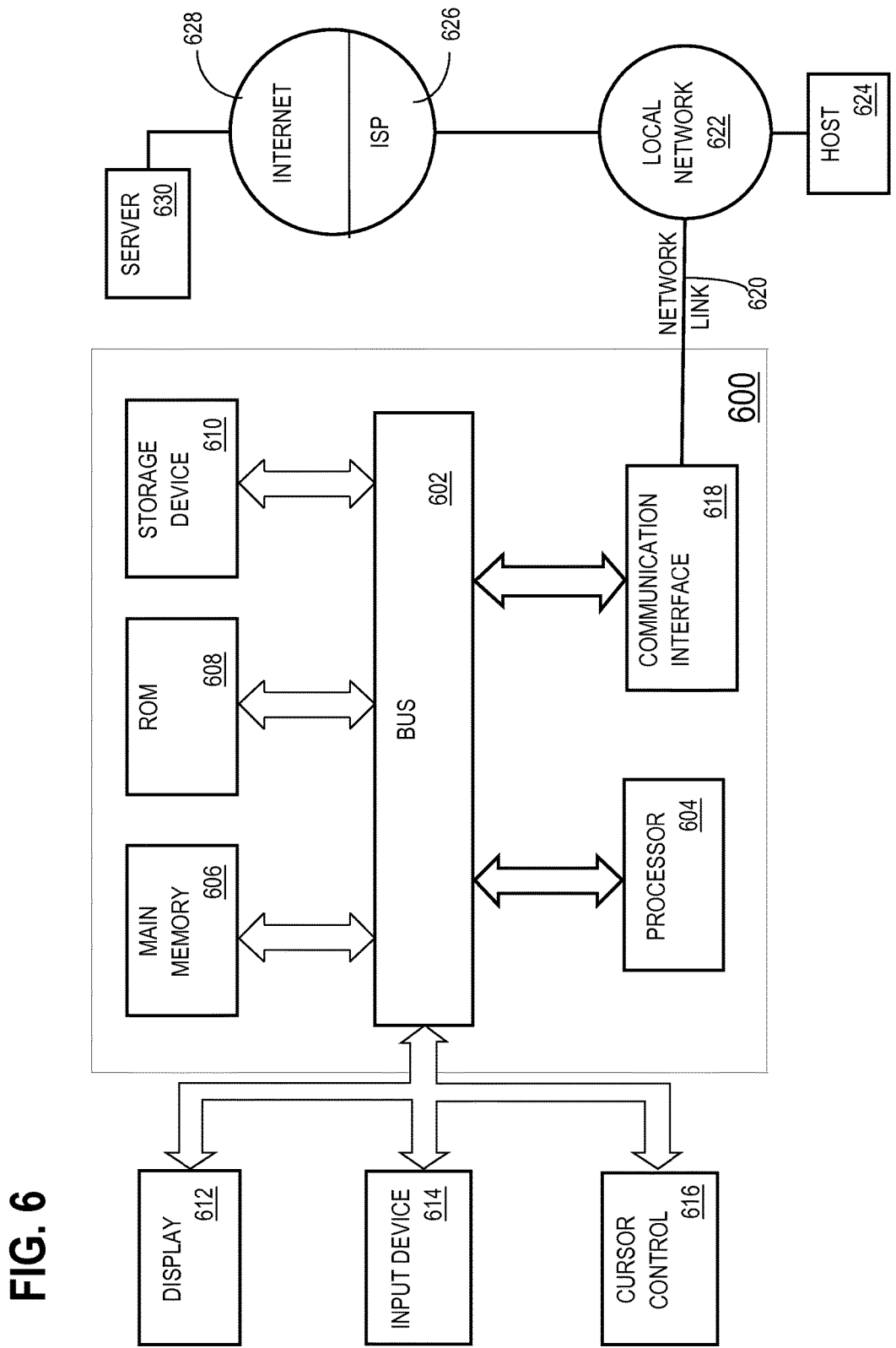
FIG. 6 is a block diagram that illustrates a computer system in accordance with one or more embodiments.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, cause:
    indexing a same set of information using a first index format, and a second index format different from the first index format, and a third index format different from the first index format and the second index format;
    forming a query execution plan, the forming operation comprising:
        dividing a search criterion into a plurality of portions, including a first portion, a second portion, and a third portion;
        determining that the first portion of the search criterion is associated with a first set of one or more characteristics;
        based on the first set of characteristics, determining that the first index format is suitable for searching for the first portion of the search criterion, and the second index format and the third index format are not suitable for searching for the first portion of the search criterion;
        determining that the second portion of the search criterion is associated with a second set of one or more characteristics;
        based on the second set of characteristics, determining that the first index format and the second index format are suitable for searching for the second portion of the search criterion, and the third index format are not suitable for searching for the first portion of the search criterion;
        determining that the third portion of the search criterion is associated with a third set of one or more characteristics;
        based on the third set of characteristics, determining that the third index format is suitable for searching for the third portion of the search criterion, and the first index format and the second index format are not suitable for searching for the first portion of the search criterion;
        selecting one of at least the first index format and the second index format to search for the second portion of the search criterion, the selecting operation comprising:
            determining that selecting the first index format, as compared to selecting the second index format, results in a larger number of portions that are grouped together for being processed in a single search;
            responsive to the determining operation: selecting the first index format to search for the second portion of the search criterion;
    executing a first search, for the first portion of the search criterion and the second portion of the search criterion, on the set of information in the first index format using a first search algorithm to obtain a first set of intermediary search results;

executing a second search, for the third portion of the search criterion, on the set of information in the third index format using a second search algorithm to obtain a second set of intermediary search results;

based on the first set of intermediary search results and the second set of intermediary search results, determining a set of final search results corresponding to the search criterion.

2. The one or more non-transitory machine-readable media of claim 1, wherein executing the first search is performed on a first machine and executing the second search is performed on a second machine different than the first machine.

3. The one or more non-transitory machine-readable media of claim 1, further storing instructions which, when executed by the one or more processors, cause:
   determining that a fourth portion of the search criterion is associated with a fourth set of one or more characteristics;
   based on the fourth set of characteristics, selecting a fourth index format and a fourth search algorithm corresponding to the fourth index format, to search for the fourth portion of the search criterion; and
   executing a third search, for the fourth portion of the search criterion, on the set of information in the fourth index format using the fourth search algorithm to obtain a third set of intermediary search results;
   wherein the set of final search results based on the first set of intermediary search results and the second set of intermediary search results is further based on the third set of intermediary search results.

4. The one or more non-transitory machine-readable media of claim 1, wherein determining the set of final search results comprises:
   selecting each search result that appears in both the first set of intermediary search results and the second set of intermediary search results to include in the set of final search results.

5. The one or more non-transitory machine-readable media of claim 1, wherein determining the set of final search results comprises:
   selecting each search result that appears in at least one of the first set of intermediary search results and the second set of intermediary search results to include in the set of final search results.

6. The one or more non-transitory machine-readable media of claim 1, wherein selecting the first index format is further based on determining that the set of information in the first index format is cached.

7. The one or more non-transitory machine-readable media of claim 1, further storing instructions which, when executed by the one or more processors, cause:
   identifying one or more index formats, for the set of information, that would be suitable for searching each of the plurality of portions;
   grouping the plurality of portions into a plurality of groups, wherein each of the plurality of groups is associated with a respective index format, a largest number of portions that are suitable to be searched using the first index format are grouped together in a first group of the plurality of groups, and at least the first group includes at least two portions;
   executing a single search, for each group of portions, on the set of information in the respective index format using a respective search algorithm to obtain a respective set of intermediary search results.

8. The one or more non-transitory machine-readable media of claim 1, further storing instructions which, when executed by the one or more processors, cause displaying the set of final search results at a user interface.

9. The one or more non-transitory machine-readable media of claim 1, wherein the set of information in the first index format comprises a cached version of a data set and the set of information in the second index format comprises an inverted index.

10. The one or more non-transitory machine-readable media of claim 1, wherein the first search algorithm comprises a traversal of each data entry and the second search algorithm comprises a hash look up.

11. The one or more non-transitory machine-readable media of claim 1, wherein the first index format comprises at least one of: an inverted index, a non-clustered index, a clustered index, an index of a cache, an index stored as a linked list, an index stored as a vector, an index stored as an array, an index stored as a tree structure, and an index stored as a table.

12. The one or more non-transitory machine-readable media of claim 1, wherein the operation of executing the first search to obtain the first set of intermediary search results does not depend on the operation of executing the second search to obtain the second set of intermediary search results, and the operation of executing the second search to obtain the second set of intermediary search results does not depend on the operation of executing the first search to obtain the first set of intermediary search results.

13. The one or more non-transitory machine-readable media of claim 1, further storing instructions which, when executed by the one or more processors, cause:
   based on the first set of characteristics, determining that the first index format and a fourth index format are suitable for searching for the first portion of the search criterion;
   selecting the first index format, rather than the fourth index format, to search for the first portion of the search criterion.

14. The one or more non-transitory machine-readable media of claim 1, wherein determining that selecting the first index format, as compared to selecting the second index format, results in the larger number of portions that are grouped together for being processed in the single search comprises:
   determining a first number of portions that are grouped together if the first index format is selected for the second portion;
   determining a second number of portions that are grouped together if the second index format is selected for the second portion;
   determining that the first number is greater than the second number.

15. A method, comprising:
   indexing a same set of information using a first index format, and a second index format different from the first index format, and a third index format different from the first index format and the second index format;
   forming a query execution plan, the forming operation comprising:
      partitioning a search criterion into a plurality of portions, including a first portion, a second portion, and a third portion;
      determining that the first portion of the search criterion is associated with a first set of one or more characteristics;

based on the first set of characteristics, determining that the first index format is suitable for searching for the first portion of the search criterion, and the second index format and the third index format are not suitable for searching for the first portion of the search criterion;

determining that the second portion of the search criterion is associated with a second set of one or more characteristics;

based on the second set of characteristics, determining that the first index format and the second index format are suitable for searching for the second portion of the search criterion, and the third index format are not suitable for searching for the first portion of the search criterion;

determining that the third portion of the search criterion is associated with a third set of one or more characteristics;

based on the third set of characteristics, determining that the third index format is suitable for searching for the third portion of the search criterion, and the first index format and the second index format are not suitable for searching for the first portion of the search criterion;

selecting one of at least the first index format and the second index format to search for the second portion of the search criterion, the selecting operation comprising:
   determining that selecting the first index format, as compared to selecting the second index format, results in a larger number of portions that are grouped together for being processed in a single search;
   responsive to the determining operation: selecting the first index format to search for the second portion of the search criterion;

executing a first search, for the first portion of the search criterion and the second portion of the search criterion, on the set of information in the first index format using a first search algorithm to obtain a first set of intermediary search results;

executing a second search, for the third portion of the search criterion, on the set of information in the third index format using a second search algorithm to obtain a second set of intermediary search results;

based on the first set of intermediary search results and the second set of intermediary search results, determining a set of final search results corresponding to the search criterion;

wherein the method is performed by at least one device including a hardware processor.

16. The method of claim 15, wherein executing the first search is performed on a first machine and executing the second search is performed on a second machine different than the first machine.

17. The method of claim 15, further comprising:
   determining that a fourth portion of the search criterion is associated with a fourth set of one or more characteristics;
   based on the fourth set of characteristics, selecting a fourth index format and a fourth search algorithm corresponding to the fourth index format, to search for the fourth portion of the search criterion; and
   executing a third search, for the fourth portion of the search criterion, on the set of information in the fourth index format using the fourth search algorithm to obtain a third set of intermediary search results;

wherein the set of final search results based on the first set of intermediary search results and the second set of intermediary search results is further based on the third set of intermediary search results.

18. The method of claim 15, wherein determining the set of final search results comprises:
   selecting each search result that appears in both the first set of intermediary search results and the second set of intermediary search results to include in the set of final search results.

19. The method of claim 15, wherein determining the set of final search results comprises:
   selecting each search result that appears in at least one of the first set of intermediary search results and the second set of intermediary search results to include in the set of final search results.

20. The method of claim 15, further comprising:
   identifying one or more index formats, for the set of information, that would be suitable for searching each of the plurality of portions;
   grouping the plurality of portions into a plurality of groups, wherein each of the plurality of groups is associated with a respective index format, a largest number of portions that are suitable to be searched using the first index format are grouped together in a first group of the plurality of groups, and at least the first group includes at least two portions;
   executing a single search, for each group of portions, on the set of information in the respective index format using a respective search algorithm to obtain a respective set of intermediary search results.

21. A system, comprising:
   at least one device including a hardware processor;
   the system being configured to perform operations comprising:
   indexing a same set of information using a first index format, and a second index format different from the first index format, and a third index format different from the first index format and the second index format;
   forming a query execution plan, the forming operation comprising:
      partitioning a search criterion into a plurality of portions, including a first portion, a second portion, and a third portion;
      determining that the first portion of the search criterion is associated with a first set of one or more characteristics;
      based on the first set of characteristics, determining that the first index format is suitable for searching for the first portion of the search criterion, and the second index format and the third index format are not suitable for searching for the first portion of the search criterion;
      determining that the second portion of the search criterion is associated with a second set of one or more characteristics;
      based on the second set of characteristics, determining that the first index format and the second index format are suitable for searching for the second portion of the search criterion, and the third index format are not suitable for searching for the first portion of the search criterion;
      determining that the third portion of the search criterion is associated with a third set of one or more characteristics;

based on the third set of characteristics, determining that the third index format is suitable for searching for the third portion of the search criterion, and the first index format and the second index format are not suitable for searching for the first portion of the search criterion;

selecting one of at least the first index format and the second index format to search for the second portion of the search criterion, the selecting operation comprising:

determining that selecting the first index format, as compared to selecting the second index format, results in a larger number of portions that are grouped together for being processed in a single search;

responsive to the determining operation: selecting the first index format to search for the second portion of the search criterion;

executing a first search, for the first portion of the search criterion and the second portion of the search criterion, on the set of information in the first index format using a first search algorithm to obtain a first set of intermediary search results;

executing a second search, for the third portion of the search criterion, on the set of information in the third index format using a second search algorithm to obtain a second set of intermediary search results;

based on the first set of intermediary search results and the second set of intermediary search results, determining a set of final search results corresponding to the search criterion.

22. The system of claim 21, wherein executing the first search is performed on a first device within the system, and executing the second search is performed on a second device within the system, the second device being different than the first device.

* * * * *